United States Patent
Wochner et al.

(10) Patent No.: US 9,073,756 B2
(45) Date of Patent: Jul. 7, 2015

(54) LOW-DOPANT POLYCRYSTALLINE SILICON CHUNK

(71) Applicant: Wacker Chemie AG, Munich (DE)

(72) Inventors: Hanns Wochner, Burghausen (DE); Andreas Killinger, Munich (DE); Reiner Pech, Neuoetting (DE)

(73) Assignee: Wacker Chemie AG, Munich (DE)

( * ) Notice: Subject to any disclaimer, the term of this patent is extended or adjusted under 35 U.S.C. 154(b) by 198 days.

(21) Appl. No.: 13/710,859

(22) Filed: Dec. 11, 2012

(65) Prior Publication Data

US 2013/0189176 A1 Jul. 25, 2013

(30) Foreign Application Priority Data

Jan. 24, 2012 (DE) .................. 10 2012 200 992

(51) Int. Cl.
*C01B 33/02* (2006.01)
*C01B 33/021* (2006.01)
*C01B 33/035* (2006.01)
*C01B 33/037* (2006.01)

(52) U.S. Cl.
CPC .............. *C01B 33/02* (2013.01); *C01B 33/021* (2013.01); *C01B 33/035* (2013.01); *C01B 33/037* (2013.01)

(58) Field of Classification Search
CPC .... C01B 33/02; C01B 33/037; C01B 33/035; C01B 33/021
USPC .................................................. 423/348–350
See application file for complete search history.

(56) References Cited

U.S. PATENT DOCUMENTS

| | | |
|---|---|---|
| 5,361,128 A | 11/1994 | Bourbina et al. |
| 5,436,164 A | 7/1995 | Dumler et al. |
| 6,309,467 B1 | 10/2001 | Wochner et al. |
| 2003/0159647 A1 | 8/2003 | Arvidson et al. |
| 2005/0135986 A1 | 6/2005 | Weidhaus et al. |
| 2010/0001106 A1 | 1/2010 | Schaefer et al. |
| 2010/0154357 A1 | 6/2010 | Wochner et al. |
| 2010/0219380 A1 | 9/2010 | Hertlein et al. |
| 2010/0320072 A1 | 12/2010 | Schwarz et al. |
| 2011/0184205 A1 | 7/2011 | Rauleder et al. |
| 2011/0186087 A1 | 8/2011 | Wochner et al. |
| 2011/0286906 A1 | 11/2011 | Arvidson et al. |
| 2012/0060562 A1 | 3/2012 | Wochner et al. |
| 2012/0193214 A1 | 8/2012 | Paetzold et al. |

FOREIGN PATENT DOCUMENTS

| | | |
|---|---|---|
| DE | 3007377 A1 | 9/1981 |
| DE | 4137521 A1 | 5/1992 |
| DE | 4330598 A1 | 4/1994 |
| DE | 102007014107 A1 | 9/2008 |
| DE | 102008054537 A1 | 6/2010 |
| DE | 102011077455 A1 | 11/2011 |
| DE | 102011003453 A1 | 8/2012 |
| EP | 0338682 A2 | 10/1989 |
| EP | 0345618 A2 | 12/1989 |
| EP | 1544167 A1 | 6/2005 |
| EP | 2036858 A2 | 3/2009 |
| EP | 2431329 A1 | 3/2012 |
| JP | 2004161595 A | 6/2004 |
| JP | 2010528955 A | 8/2010 |
| WO | 2009024478 A2 | 2/2009 |
| WO | 2009047107 A2 | 4/2009 |

OTHER PUBLICATIONS

PatBase abstract for DE 10 2011 077 455.

*Primary Examiner* — Anthony J Zimmer
(74) *Attorney, Agent, or Firm* — Caesar Rivise, PC

(57) ABSTRACT

The invention provides a polycrystalline silicon chunk having a concentration of 1-50 ppta of boron and 1-50 ppta of phosphorus at the surface.

18 Claims, No Drawings

LOW-DOPANT POLYCRYSTALLINE SILICON CHUNK

BACKGROUND OF THE INVENTION

The invention provides a low-dopant polycrystalline silicon chunk.

On the industrial scale, crude silicon is obtained by the reduction of silicon dioxide with carbon in a light arc furnace at temperatures of about 2000° C.

This affords "metallurgical grade" silicon ($Si_{mg}$) having a purity of about 98-99%.

For applications in photovoltaics and in microelectronics, the metallurgical grade silicon has to be purified. For this purpose, it is reacted, for example, with gaseous hydrogen chloride at 300-350° C. in a fluidized bed reactor to give a silicon-containing gas, for example trichlorosilane. This is followed by distillation steps in order to purify the silicon-containing gas.

This high-purity silicon-containing gas then serves as a starting material for the production of high-purity polycrystalline silicon.

The polycrystalline silicon, often also called polysilicon for short, is typically produced by means of the Siemens process. This involves heating thin filament rods of silicon by direct passage of current in a bell-shaped reactor ("Siemens reactor"), and introducing a reaction gas comprising a silicon-containing component and hydrogen.

The silicon-containing component of the reaction gas is generally monosilane or a halosilane of the general composition $SiH_nX_{4-n}$ (n=0, 1, 2, 3; X=Cl, Br, I). It is preferably a chlorosilane, more preferably trichlorosilane. Predominantly $SiH_4$ or $SiHCl_3$ (trichlorosilane, TCS) is used in a mixture with hydrogen.

In the Siemens process, the filament rods are typically inserted perpendicularly into electrodes present at the reactor base, through which they are connected to the power supply. Every two filament rods are coupled via a horizontal bridge (likewise composed of silicon) and form a support body for the silicon deposition. The bridge coupling produces the typical U shape of the carrier bodies, which are also called thin rods.

High-purity polysilicon is deposited on the heated rods and the bridge, as a result of which the rod diameter grows with time (CVD=Chemical Vapor Deposition/gas phase deposition).

After the deposition has ended, these polysilicon rods are typically processed further by means of mechanical processing to give fragments of different size classes, classified, optionally subjected to a wet-chemical purification and finally packed.

Polycrystalline silicon serves as a starting material in the production of monocrystalline silicon by means of crucible pulling (Czochralski or CZ process) or by means of zone melting (float zone or FZ process).

More particularly, however, polycrystalline silicon is required for production of mono- or multicrystalline silicon by means of pulling or casting processes, this mono- or multicrystalline silicon serving for production of solar cells for photovoltaics.

Since the quality demands on polysilicon are becoming ever higher, constant process improvements are necessary with respect to contamination with metals or dopants. A distinction should be made between contamination in bulk and contamination at the surface of the polysilicon fragments or rod pieces.

US2003/0159647 A1 discloses polycrystalline silicon chips having contamination of less than or equal to 0.06 ppba of boron and of less than or equal to 0.02 ppba of phosphorus in the bulk. US 2003/0159647 A1 does not give any information about the contamination of the surface with dopants.

EP1544167 A1 discloses polycrystalline silicon granules, the particles having a particle size between 100 μm and 3000 μm, a dopant content of phosphorus less than 300 ppta, a dopant content of boron less than 300 ppta and a total content of the metals Fe, Cr, Ni, Cu, Ti, Zn and Na of less than 50 ppbw. EP1544167 A1 does not give any information about the contamination of the surface of the granules with dopants.

Both publications cited mention only dopant concentrations in the bulk (US2003/0159647 A1) or total concentrations (bulk and surface, EP1544167 A1).

It is known that the process steps for production of polysilicon, such as the comminution of rods, have an influence on the surface contamination with metals and dopants.

DE 41 37 521 A1 describes a process for analyzing the concentration of contaminants in silicon particles, which comprises adding particulate silicon to a silicon vessel, processing the particulate silicon and the silicon vessel to give monocrystalline silicon in a float zone, and determining the concentration of contaminants present in the monocrystalline silicon. The concentrations of boron, phosphorus, aluminum and carbon in the silicon vessel used were determined and give a reproducible background value.

The values of boron, phosphorus and carbon obtained by means of FTIR (Fourier Transform IR Spectroscopy) after the float zone process were corrected by the proportion which originated from the silicon vessel.

This application also shows that the fragmentation of a polycrystalline silicon rod leads to contamination of the silicon. This is possible by introducing silicon fragments into the silicon vessel, subjecting it to the float zone process and then analyzing it for contaminants. Since the contamination of the base material prior to fragmentation is known, the additional contamination as a result of the fragmentation can be concluded.

DE 43 30 598 A1 likewise discloses a process which enables conclusion of the contamination of silicon as a result of comminution processes. A silicon block was crushed to lumps. The silicon lumps were then subjected to a zone melting process and converted to a single crystal. A wafer was sawn out of the single crystal and analyzed for boron and phosphorus by means of photoluminescence. Compared to the average boron and phosphorus contents of the silicon block used, an increase in the boron and phosphorus concentrations is found, which is attributable to the comminution process among other factors.

According to SEMI MF 1398, dopants are analyzed by means of photoluminescence in an FZ single crystal obtained from the polycrystalline material (SEMI MF 1723). As an alternative, low-temperature FTIR is used (SEMI MF 1630). Fundamentals of the FZ process are described, for example, in DE 3007377 A.

In the FZ process, a polycrystalline stock rod is gradually melted with the aid of a high-frequency coil, and the molten material is converted to a single crystal by seeding with a monocrystalline seed crystal and subsequent recrystallization. In the course of recrystallization, the diameter of the single crystal forming is first increased in a cone shape (cone formation) until a desired final diameter has been attained (rod formation). In the cone formation phase, the single crystal can also be mechanically supported in order to take the load off the thin seed crystal.

In the prior art, efforts have been made to examine the influence of a single process step on any surface contamination of polysilicon with dopants.

However, it has to date not been possible to distinctly reduce the dopants at the surface of polysilicon, even though it is known that dopants affect the physical properties of the material.

The problems described gave rise to the objective of the invention.

DESCRIPTION OF THE INVENTION

The object of the invention is achieved by a polycrystalline silicon chunk having a concentration of 1-50 ppta of boron and 1-50 ppta of phosphorus at the surface.

The concentration of boron at the surface is preferably 1-30 ppta, more preferably 1-20 ppta.

The concentration of phosphorus at the surface is preferably 1-25 ppta, more preferably 1-20 ppta.

The concentration of arsenic at the surface is preferably 0.01-10 ppta, more preferably 0.01-5 ppta, most preferably 0.01-2 ppta.

The concentration of aluminum at the surface is preferably 0.01-10 ppta, more preferably 0.01-5 ppta, most preferably 0.01-2 ppta.

The dopant surface contamination of polycrystalline silicon can be determined by analyzing one rod of two polycrystalline silicon rods obtained by deposition in a Siemens reactor for contamination with dopants (bulk and surface) immediately after the deposition, while the second rod passes through the systems in which the rod is processed further and, after passing through the systems, is likewise analyzed for contamination with dopants (bulk and surface). Since the two rods can be assigned the same level of bulk contamination, the difference in the two contaminations determined gives the surface contamination which is caused by further processing steps such as comminution, cleaning, transport and packaging. This can be ensured at least when rod and brother rod have been deposited on one and the same U-shaped support body.

Alternatively, the process described in DE 41 37 521 A1 can be used. For this purpose, small fragments which have been obtained from a polycrystalline silicon rod are introduced into a silicon vessel and processed with the silicon vessel to give a single crystal. Here, however, the concentrations in the bulk and the contamination of the silicon vessel have to be subtracted from the total contamination determined.

In the context of the invention, dopants (B, P, As, Al) are analyzed by means of photoluminescence to SEMI MF 1398 on a FZ single crystal produced from the polycrystalline material (SEMI MF 1723).

A wafer is separated from the monocrystalline rod obtained by means of FZ from a polycrystalline silicon rod or from polycrystalline silicon fragments, etched with HF/HNO3, rinsed with 18 MOHm water and dried. The photoluminescence measurements are conducted on this wafer.

The concentrations of dopants in the bulk are preferably:
phosphorus 1-20 ppta, more preferably 1-10 ppta;
boron 1-10 ppta, more preferably 1-5 ppta
arsenic 1-10 ppta, more preferably 1-5 ppta.

These values are determined by the purity of the reaction gas in the course of deposition. How the required purity of the reaction gas is accomplished will be explained later.

The polycrystalline silicon chunk preferably additionally has an etched surface.

The polycrystalline silicon chunk preferably has a concentration of metals at the surface of less than 200 pptw (10-200 pptw), more preferably 10-100 pptw.

The metals include Na, K, Ca, Mg, Ti, Cr, Fe, Co, Ni, Cu, Zn, Ga, Br, Sr, Zr, Mo, Cd, In, Sn, Ba and Pt.

The surface contamination with Fe is preferably 1-40 pptw, that with Cr 0.1-5 pptw, that with Cu 0.1-5 pptw, that with Na 1-30 pptw, that with Ni 0.1-5 pptw, that with Zn 0.1-10 pptw, that with Ti 0.1-10 pptw and that with W 0.1-10 pptw.

The surface contamination with Ca is preferably 0.1-10 pptw, more preferably 0.1-5 pptw, most preferably 0.1-1 pptw.

The surface contamination with Fe is preferably 1-20 pptw.

The surface metals are determined in the context of the invention to ASTM F 1724-96, by chemical removal of the silicon surface by dissolution and subsequent analysis of the removal solution by means of ICPMS (inductively coupled plasma mass spectrometry).

The polycrystalline silicon chunk is a rod piece or a fragment.

The values for surface dopants and metals reported for the polycrystalline silicon chunk apply irrespective of the chunk size, which is defined as the longest distance between two points on the surface of a silicon fragment (=max. length), as follows:
chunk size 0 in mm: approx. 0.5 to 5
chunk size 1 in mm: approx. 3 to 15
chunk size 2 in mm: approx. 10 to 40
chunk size 3 in mm: approx. 20 to 60
chunk size 4 in mm: approx. >45

The aforementioned values for the concentration of metals can be attained only by cleaning of the polycrystalline silicon chunks as described below in c) cleaning of the polycrystalline silicon fragments.

Production of the Inventive Polycrystalline Silicon Chunk a) Deposition of Polycrystalline Silicon in a Siemens Reactor Polycrystalline silicon is deposited on heated thin silicon rods, using a silicon-containing component and hydrogen as the reaction gas. The silicon-containing component is preferably a chlorosilane, more preferably trichlorosilane.

The deposition is effected according to the prior art, for which reference is made, for example, to WO 2009/047107 A2.

In order to reduce the contamination of the silicon-containing component of the reaction gas with dopants such as boron and phosphorus, various processes are known.

DE 10 2007 014 107 A1 describes a distillative process. EP 2 036 858 A2 claims a process in which boron- and phosphorus-containing chlorosilanes are contacted with the complexing agent benzaldehyde and oxygen. According to DE 10 2008 054 537, the boron content in chlorosilanes is lowered by contacting with anhydrous adsorbents.

In this regard, reference is also made to German application 102011003453.6, which was yet to be published at the priority date of the present application, and which is fully incorporated here by reference. This involves branching off low-boiling boron compounds from the distillation columns by means of top streams comprising borane-enriched DCS (dichlorosilane), and higher-boiling boron compounds by means of a borane-enriched bottom stream comprising high boilers. The process is suitable for reducing the boron and phosphorus contents to an order of magnitude of ppb.

It is therefore particularly preferable to use chlorosilanes for the deposition of polycrystalline silicon only after such a distillation step. Only thus can the aforementioned bulk values of P 1-20 ppta, B 1-10 ppta and As 1-10 ppta be accomplished. It should be noted here that not all of the dopants present in the reaction gas are incorporated into the polysilicon. Some of the dopants are removed from the deposition reactor via off gases.

b) Comminution of the Polycrystalline Silicon

After the deposition in the Siemens reactor, the silicon rods are removed from the reactor.

Before this polysilicon can be used in crystallization processes, it has to be comminuted. In the process for producing ultrapure silicon, it is necessary in various process steps to crush silicon rods of various cross sections and lengths in order to introduce them as rod pieces or fragments (chips, chunks) as starting material into other production steps, immediately or after subsequent grinding operations.

To produce the inventive silicon chunk, the polysilicon rod is first precomminuted. For this purpose, a hammer made from a low-abrasion material, for example hard metal is used. A hammer shaft consists of plastic containing less than 10 ppbw of B, P and As. The plastic used is selected from one or more elements from the group consisting of polypropylene, polyethylene, PU and polyvinylidene fluoride (PVDF).

The precomminution is effected on a workbench with a surface consisting preferably of low-wear plastic or of silicon.

The plastic used contains less than 10 ppbw of B, P and As. It is selected from one or more elements from the group consisting of polypropylene, polyethylene, PU and polyvinylidene fluoride (PVDF).

With regard to the concentrations of dopants, the silicon should meet the following conditions: phosphorus 1-20 ppta, boron 1-10 ppta, arsenic 1-10 ppta.

This is followed by comminution of the precomminuted polysilicon to the desired target size, chunk size 0, 1, 2, 3, or 4.

The comminution is effected by means of a crusher, for example with a jaw crusher.

Such a crusher is described, for example, in EP 338 682 A2.

Subsequently, the crushed silicon is classified into chunk sizes by means of a mechanical sieve, the mechanical sieve being lined with plastic or with silicon. The plastic used contains less than 10 ppbw of B, P and As. The plastic used is selected from one or more elements from the group consisting of polypropylene, polyethylene, PU and polyvinylidene fluoride (PVDF).

With regard to the concentrations of dopants, the silicon should meet the following conditions: phosphorus 1-20 ppta, boron 1-10 ppta, arsenic 1-10 ppta.

Both systems, both workbench and hammer for precomminution, and crusher, are present in a cleanroom of class 10,000 or lower.

The systems are preferably present in a cleanroom of class 100 or better (to US FED STD 209E, superseded by ISO 14644-1).

In the case of class 100 (ISO 5), max. 3.5 particles of max. diameter 0.5 µm may be present per liter.

In the cleanroom, exclusively cleanroom filters with a PTFE membrane are used. It should be ensured that the filters are free of boron.

The cleanroom filter should be constructed as follows:

It comprises a non-warpable frame which releases a small amount of particles, preferably made of wood, for example plywood, or of aluminum.

The filter further comprises a support fabric consisting of three layers. An upper layer and a lower layer consist of PE+PET. The middle layer is PTFE.

It is important that the boron content in the PTFE in the middle layer of the support fabric is less than 10 mg/kg.

Support fabric is bonded to the frame.

The boron content in the adhesive, which is preferably polyvinyl acetate, must be less than 10 mg/kg.

The phosphorus content in the adhesive must be less than 50 mg/kg.

The antimony content in the adhesive is preferably likewise less than 10 mg/kg.

The boron and phosphorus contents in the support fabric must be less than 10 mg/kg.

The antimony content in the support fabric (three layers of PE+PET & PTFE) is preferably less than 50 mg/kg.

An ionization system is preferably implemented in the cleanroom in order to neutralize electrostatic charges by active air ionization. Ionizers permeate the cleanroom air with ions such that static charges on insulators and ungrounded conductors are dissipated.

For lining of metal parts on the crusher, at least one plastic selected from one or more elements from the group consisting of polypropylene, polyethylene, PU and PVDF is used, the lining of the crusher containing less than 100 ppbw of boron, less than 100 ppbw of phosphorus and less than 10 ppbw of arsenic.

c) Cleaning of the Polycrystalline Silicon Fragments

Optionally, the fragments are cleaned.

For this purpose, the polysilicon fragments are washed in a prepurification with an oxidizing cleaning solution in at least one stage, in a main purification with a cleaning solution comprising nitric acid and hydrofluoric acid in a further stage, and in a hydrophilization with an oxidizing cleaning fluid in yet a further stage.

Prepurification is preferably effected by means of HF/HCl/$H_2O_2$. Hydrophilization of the silicon surface is preferably effected by means of HCl/$H_2O_2$.

The cleaning system is present within a cleanroom of class 10,000 or lower, preferably in a cleanroom of class 100 or better.

In the cleanroom, exclusively cleanroom filters with a PTFE membrane are used, with a structure and a composition as described under b) comminution of the polycrystalline silicon.

For lining of etching tanks and pipelines, at least one plastic selected from one or more elements from the group consisting of polypropylene, polyethylene, PU and PVDF must be used, this comprising less than 100 ppbw of boron, additionally less than 100 ppbw of phosphorus and preferably also less than 10 ppbw of arsenic.

In the case of the acids used in the cleaning process, for example HF, HCl and $HNO_3$, it should be ensured that they contain less than 10 ppbw of boron and additionally less than 500 ppbw of phosphorus.

The acids preferably contain less than 50 ppbw of arsenic.

In order to ensure the use of low-dopant acids, the dopant contents of the acids for prepurification and main purification and hydrophilization are monitored in this regard. For this purpose, prior to each of the cleaning operations, the boron, phosphorus and arsenic contents are checked. If the above-mentioned values are exceeded, the acids are replaced or fresh acid is metered into the cleaning tanks in order to ensure that less than 10 ppbw of boron and less than 500 ppbw of phosphorus is present in the acids.

After the cleaning, the polysilicon is dried, by conducting an air stream with a temperature of 20 to 120° C. through a filter with a PTFE membrane, and then directing it onto a process dish containing polysilicon in order to dry it.

The filter is preferably a high-efficiency filter of cleanroom class 100 or better. This preferably has a structure and a composition as described under b) comminution of the polycrystalline silicon.

The filter must under no circumstances consist of glass fibers, especially since they may contain more than 10% by weight of boron.

The apparatus preferably comprises a preliminary filter composed of plastic mats without a glass fiber component.

d) Packing of the Polycrystalline Silicon Fragments

After the cleaning or directly after the comminution (if no cleaning is effected), the polysilicon fragments are packed.

For this purpose, gloves made of high-purity polyethylene or of PU are used.

The material of which the gloves consist must contain less than 100 ppbw of boron, less than 100 ppbw of phosphorus and less than 10 ppbw of arsenic.

Such gloves are ideally utilized in all manual handling steps necessary in the course of production of the inventive silicon chunk.

The use of glass fiber-reinforced materials in the gloves should be avoided.

The polysilicon fragments are packed in PE bags, preferably in double PE bags.

EXAMPLES

Example 1

Production of a Low-Dopant Uncleaned Chunk Poly

On a workbench with lateral surfaces made from plastic (B, P, As content <10 ppbw), a polycrystalline silicon rod was comminuted by means of a hammer made from hard metal with a plastic shaft (B, P, As<10 ppbw).

The surface of the worktop of the workbench consisted of silicon. The silicon has the following values with regard to the concentrations of dopants: phosphorus max. 10 ppta, boron max. 5 ppta, arsenic max. 5 ppta.

The workbench was within a cleanroom of the 10,000 class with cleanroom filters having a PTFE membrane, preferably with filters as described under b) comminution of the polycrystalline silicon.

Manual handling of the rod was effected by means of gloves made from high-purity PE with less than 100 ppbw of boron, less than 100 ppbw of phosphorus and less than 10 ppbw of arsenic.

A polycrystalline rod of length 10 to 20 cm with a diameter of 1.6 cm was placed at the side of the workbench for 10 minutes. This time corresponds to the mean residence time of the material on the workbench before it is packed into the PE bag.

After 10 minutes, this polycrystalline rod was packed and then analyzed for contamination with dopants.

This was done for 12 polycrystalline silicon rods #1-#12.

12 further polycrystalline silicon rods #13-#24 were additionally conducted through the crusher without comminuting them, as a result of which, however, they were exposed to the environment of the crusher.

The crusher was within a cleanroom of the 10,000 class.

In the cleanroom, exclusively cleanroom filters with a PTFE membrane were used (boron-free PTFE filters), as described under b) comminution of the polycrystalline silicon.

For lining of metal parts on the crusher, polypropylene and polyethylene containing not more than approx. 90 ppbw of boron, not more than approx. 90 ppbw of phosphorus, not more than approx. 8 ppbw of arsenic were used.

After passing the crusher, these polycrystalline rods #13-#24 were packed and then analyzed for contamination with dopants.

Each of the 24 polycrystalline rods examined has a brother rod which was deposited simultaneously under the same conditions on a U-shaped support body in a Siemens reactor. After the deposition, the U-shaped support body was removed from the reactor, and the bridge was removed so as to obtain one rod and one brother rod in each case. The brother rod, immediately after the deposition, was packed in a PE bag and analyzed for contamination with dopants.

Since both rods, rod and brother rod, were deposited on the same U-shaped support body under the same conditions, they had the same level of contamination after deposition.

The polycrystalline rod which was placed on the workbench during the comminution and was conducted through the crusher was, however, subsequently exposed to the environment of the comminuting operations and was possibly contaminated as a result.

It was shown that the additional contamination could be restricted to an extremely low level as a result of the measures such as working in a cleanroom with specific cleanroom filters, lining of steel parts of the comminution tool with plastic, and by handling with high-purity PE gloves.

Table 1 shows the surface contamination, determined for example 1, with boron, phosphorus, aluminum and arsenic on the silicon rod.

These were determined for each of the 24 rods by forming the difference between the contamination of the rod placed on the workbench and additionally conducted through the crusher, and the contamination of the corresponding brother rod.

These results were also reproducible in the polycrystalline rod precomminuted by means of the hammer, with the alternative analysis method of capsule pulling.

For this purpose, the silicon chunks precomminuted by means of the hammer were comminuted further to chunk size 0 and 1.

TABLE 1

|     | B in ppta | P in ppta | Al in ppta | As in ppta |
| --- | --- | --- | --- | --- |
| #1  | 11 | 43 | 0.7 | 0.3 |
| #2  | 4  | 46 | 0.6 | 0.9 |
| #3  | 9  | 21 | 0.4 | 0.6 |
| #4  | 18 | 27 | 0.3 | 1.3 |
| #5  | 11 | 16 | 0.6 | 2 |
| #6  | 15 | 4  | <0.6 | 2 |
| #7  | 11 | 5  | <0.1 | <0.1 |
| #8  | 12 | 24 | <0.1 | 1 |
| #9  | 2  | 11 | 8 | <0.1 |
| #10 | 18 | 2  | <0.1 | 2 |
| #11 | 47 | 13 | <0.11 | 2 |
| #12 | 28 | 3  | <0.11 | 6 |
| #13 | 33 | 15 | 1 | 2 |
| #14 | 26 | 5  | <0.1 | 1 |
| #15 | 17 | 21 | <0.1 | 1 |
| #16 | 20 | 17 | <0.1 | 2 |
| #17 | 29 | <1 | <0.1 | <0.1 |
| #18 | 21 | 5  | <0.1 | <0.1 |
| #19 | 31 | 6  | 5 | 8 |
| #20 | 38 | 2  | 0.3 | 3 |
| #21 | 29 | 17 | 1 | 5 |
| #22 | 39 | 44 | <0.1 | 8 |
| #23 | 4  | 11 | <0.1 | 7 |
| #24 | 24 | 26 | 2 | 2 |

The comminution is again effected by means of a crusher as described above, which was within a cleanroom of the 10,000 class. For lining of metal parts in the crusher, polypropylene and polyethylene containing not more than approx. 90 ppbw of boron, not more than approx. 90 ppbw of phosphorus, not more than approx. 8 ppbw of arsenic were used. In the cleanroom, exclusively cleanroom filters with a PTFE membrane were used (boron-free PTFE filters).

The silicon comminuted to chunk size 0 and 1 was introduced into 5 silicon vessels and processed to 5 FZ rods.

A wafer was divided from each of these, etched with HF/HNO3, rinsed with 18 MOHm water and dried. Photoluminescence measurements were conducted on the wafers.

The known bulk concentrations for boron and phosphorus were subtracted from the values determined.

Table 2 shows the resulting values for boron and phosphorus in ppta.

First of all, a good agreement of the results of the two test methods was found.

In addition, it is found that the comminution of the rod by means of the crusher does not result in a rise in the level of contamination with surface dopants compared to precomminution with the hammer.

This demonstrates that the mechanical processing, i.e. processing with a hammer or comminution in a crusher, in principle does not have any significant influence on the content of surface dopants.

This is in accordance with the results shown in table 1. Here too, no significant changes are found in the case of the rods which had additionally been conducted through the crusher.

The surface cleanliness in relation to dopants is influenced significantly by the lining of the metal parts, the cleanroom conditions and the handling.

The analysis method using a brother rod as a reference is preferred in the context of the invention.

TABLE 2

|    | B in ppta | P in ppta |
|----|-----------|-----------|
| #1 | 20        | 6         |
| #2 | 29        | 16        |
| #3 | 31        | 22        |
| #4 | 37        | 17        |
| #5 | 12        | 9         |

Example 2

Production of Low-Dopant Cleaned Chunk Poly

A polysilicon rod was comminuted (precomminution with a hammer and comminution by means of a crusher to chunk size 4).

This was done using steel tools. In this context, US2010/0001106 A1 is incorporated by reference in full. It is known that contamination which arises can be removed easily in a subsequent cleaning step.

5 kg of chunk poly of chunk size 4 were treated in a process dish in a three-stage wet-chemical process. The preliminary cleaning and main cleaning were effected in separate acid circuits:

a) Preliminary cleaning in etchant

Cleaning for 20 min in a mixture of 5% by weight of HF, 8% by weight of HCl, 3% by weight of $H_2O_2$ at a temperature of 22° C.

Material removal: 0.02 μm b) Rinsing with ultrapure water 18 MOHM at 22° C. for 5 minutes c) Main cleaning: etching at 8° C. for 5 min HF/HNO$_3$ with 6% by weight of HF, 55% by weight of HNO$_3$ and 1% by weight of Si Etching removal: approx. 30 μm d) Rinsing with 18 MOHM ultrapure water at 22° C. for 5 min e) Hydrophilization in water at 22° C. saturated with 20 ppm of ozone for 5 min f) Drying with ultrapure air of the 100 class at 80° C. with a boron-free PTFE filter for 60 min (construction and composition as described under b) comminution of the polycrystalline silicon)

g) Cooling with ultrapure air, 22° C. with PTFE filter (construction and composition as described under b) comminution of the polycrystalline silicon)

h) Manual packing of the polysilicon by means of a PE glove in an ultraclean PE bag All plastics used had boron, phosphorus and arsenic content less than 10 ppbw.

The mineral acids HCl, HF and nitric acid used contained a maximum of 10 ppbw of boron, 500 ppbw of phosphorus and 50 ppbw of arsenic.

In addition, 27 polycrystalline silicon rods, each of length 10 to 20 cm and having a diameter of in each case 1.6 cm, were exposed analogously to example 1 to the conditions of precomminution and of processing with a crusher, except that, in a departure from example 1, steel tools according to US2010/0001106 A1 were used. The rods were each placed on a workbench, while a rod was comminuted by means of a hammer thereon. In addition, the rods were conducted through the crusher without undertaking comminution.

Subsequently, these rods were subjected to the treatment according to steps a) to g).

Finally, the rods were each packed by means of a PE glove in an ultraclean PE bag.

These rods were analyzed for contamination with dopants. The reference used in each case was again an untreated brother rod from the same deposition batch. During the deposition, two filament rods in each case were coupled via a horizontal bridge and formed a support body for the silicon deposition. After deposition, after removal of the bridge, two rods resulted in each case: rod and brother rod.

It was shown that the cleaning according to steps a) to h) and the packing according to step h) led to even better values compared to example 1 for surface contamination with dopants. Precomminution and crushing took place under the same conditions.

Table 3 shows the surface contamination with boron, phosphorus, aluminum and arsenic determined for example 2.

The values result in each case from difference formation: contaminants (treated rod) minus contaminants (untreated reference rod=brother rod).

The values were also reproducible through analysis by means of FZ capsule pulling on fragments of size 0 and 1 (produced by precomminution of a rod and crushing to size 0 and 1 with steel tools in each case) and corresponding treatment according to steps a) to g).

TABLE 3

|     | B in ppta | P in ppta | Al in ppta | As in ppta |
|-----|-----------|-----------|------------|------------|
| #1  | 14        | 1         | <0.1       | 4          |
| #2  | 19        | 5         | <0.1       | 2          |
| #3  | 25        | 4         | 3          | 5          |
| #4  | 18        | 8         | 1          | <0.1       |
| #5  | 27        | 1         | 1          | 4          |
| #6  | 18        | 7         | <0.1       | 0.2        |
| #7  | 4         | 4         | 0.9        | <0.1       |
| #8  | 4         | 10        | 4          | 7          |
| #9  | 16        | 9         | 2          | 3          |
| #10 | 8         | 9         | <0.1       | <0.1       |

TABLE 3-continued

|   | B in ppta | P in ppta | Al in ppta | As in ppta |
|---|---|---|---|---|
| #11 | 7 | 20 | 1 | 3 |
| #12 | 19 | 4 | 0.8 | 4 |
| #13 | 16 | 9 | <0.1 | 2 |
| #14 | 9 | 17 | <0.1 | 4 |
| #15 | 2 | <1 | 0.6 | <0.1 |
| #16 | 3 | 21 | 1 | 2 |
| #17 | 2 | 2 | 1 | 2 |
| #18 | 3 | 16 | 6 | 4 |
| #19 | 6 | 11 | <0.1 | 1 |
| #20 | 7 | <1 | 1 | <0.1 |
| #21 | 6 | <1 | <0.2 | 1 |
| #22 | 8 | 12 | <0.1 | 4 |
| #23 | 5 | 13 | 7 | 4 |
| #24 | 5 | 5 | <1 | 5 |
| #25 | 8 | <1 | <0.1 | 1 |
| #26 | 10 | <1 | 5 | 4 |
| #27 | 9 | 2 | 1 | 1 |

Example 3

Comparative Example

A polysilicon rod was also comminuted to chunk size 4 analogously to example 2.

5 kg of chunk poly of chunk size 4 were then, in a departure from example 2, treated wet-chemically in a process dish. The preliminary cleaning and main cleaning were effected in separate acid circuits:

a) Preliminary cleaning in etchant

Cleaning in a mixture of 5% by weight of HF, 8% by weight of HCl, 3% by weight of $H_2O_2$ at a temperature of 22° C. for 20 min;

Material removal: 0.02 μm b) Rinsing with 18 MOHM ultrapure water (5 minutes, 22° C.)

c) Main cleaning: etching at 8° C. with $HF/HNO_3$ with 6% by weight of HF, 55% by weight of $HNO_3$ and 1% by weight of Si for 5 min;

Etching removal: approx. 30 μm d) Rinsing with 18 MOHM ultrapure water at 22° C. for 5 min e) Hydrophilization in water at 22° C. saturated with 20 ppm of ozone for 5 min f) Drying with class 100 ultrapure air at 80° with a boron-containing glass fiber with 11% by weight of $B_2O_3$ for 60 min g) Cooling with 22° C. ultrapure air with a cleanroom filter having a boron-containing glass fiber with 11% by weight of $B_2O_3$ h) Manual packing with a commercially available cotton/polyester glove (boron content >50 pptw, P>50 pptw and As>10 pptw).

Etching tanks and pipelines were not sheathed with specialty plastics.

The mineral acids HCl, HF and nitric acid used were of technical grade quality (B>10 ppbw, P>500 ppbw and As>50 ppbw).

14 polycrystalline rods of length 10 to 20 cm, each with a diameter of 1.6 cm, were also subjected to the same treatment according to steps a) to h). These had been exposed beforehand, as in example 2, to the conditions of the precomminution with a hammer and of the crusher.

These rods were analyzed for contamination with boron and phosphorus. The reference used in each case was again an untreated brother rod from the same deposition batch. Two filament rods in each case were coupled via a horizontal bridge during the deposition and formed a support body for the silicon deposition. After deposition, after removal of the bridge, two rods resulted in each case: rod and brother rod.

Table 4 shows the surface contamination with B and P determined for example 3.

The values each result from difference formation: contaminants (treated rod) minus contaminants (untreated reference rod=brother rod).

Distinctly increased values were found compared to example 2, and these were also reproducible by the FZ capsule pulling analysis method on fragments of sizes 0 and 1 treated correspondingly according to steps a) to h).

TABLE 4

|   | B in ppta | P in ppta |
|---|---|---|
| #1 | 73 | 106 |
| #2 | 112 | 70 |
| #3 | 177 | 54 |
| #4 | 62 | 70 |
| #5 | 60 | 59 |
| #6 | 61 | 67 |
| #7 | 74 | 105 |
| #8 | 119 | 405 |
| #9 | 138 | 332 |
| #10 | 56 | 76 |
| #11 | 518 | 304 |
| #12 | 71 | 65 |
| #13 | 128 | 250 |
| #14 | 106 | 225 |

What is claimed is:

1. A polycrystalline silicon chunk having a concentration of 1-50 ppta of boron and a concentration of 1-50 ppta of phosphorus at a surface of the polycrystalline silicon chunk.

2. The polycrystalline silicon chunk as claimed in claim 1, wherein the concentration of boron at the surface is 1-30 ppta.

3. The polycrystalline silicon chunk as claimed in claim 1, wherein the concentration of phosphorus at the surface is 1-25 ppta.

4. The polycrystalline silicon chunk as claimed in claim 1, having a concentration of arsenic of 0.01-10 ppta at the surface.

5. The polycrystalline silicon chunk as claimed in claim 1, having a concentration of aluminum of 0.01-10 ppta at the surface.

6. The polycrystalline silicon chunk as claimed in claim 1, having a concentration of metals at the surface of 10-200 pptw.

7. The polycrystalline silicon chunk as claimed in claim 1, having the following metal concentrations at the surface:
Fe: 1-40 pptw;
Cr: 0.1-5 pptw;
Cu: 0.1-5 pptw;
Na: 1-30 pptw;
Ni: 0.1-5 pptw;
Ca: 0.1-10 pptw;
Ti: 0.1-10 pptw;
W: 0.1-10 pptw; and
Zn: 0.1-10 pptw.

8. The polycrystalline silicon chunk as claimed in claim 7, wherein the concentration of Fe at the surface is 1-20 pptw.

9. The polycrystalline silicon chunk as claimed in claim 1, wherein dopants are present in a bulk in the following concentrations: phosphorus 1-20 ppta, boron 1-10 ppta and arsenic 1-10 ppta.

10. The polycrystalline silicon chunk as claimed in claim 9, wherein the dopants are present in the bulk in the following concentrations: phosphorus 1-10 ppta, boron 1-5 ppta and arsenic 1-5 ppta.

11. The polycrystalline silicon chunk as claimed in claim 2, wherein the concentration of phosphorus at the surface is 1-25 ppta.

12. The polycrystalline silicon chunk as claimed in claim 11, having a concentration of arsenic of 0.01-10 ppta at the surface.

13. The polycrystalline silicon chunk as claimed in claim 12, having a concentration of aluminum of 0.01-10 ppta at the surface.

14. The polycrystalline silicon chunk as claimed in claim 13, having a concentration of metals at the surface of 10-200 pptw.

15. The polycrystalline silicon chunk as claimed in claim 14, having the following metal concentrations at the surface:
Fe: 1-40 pptw;
Cr: 0.1-5 pptw;
Cu: 0.1-5 pptw;
Na: 1-30 pptw;
Ni: 0.1-5 pptw;
Ca: 0.1-10 pptw;
Ti: 0.1-10 pptw;
W: 0.1-10 pptw; and
Zn: 0.1-10 pptw.

16. The polycrystalline silicon chunk as claimed in claim 15, wherein the concentration of Fe at the surface is 1-20 pptw.

17. The polycrystalline silicon chunk as claimed in claim 16, wherein dopants are present in a bulk in the following concentrations: phosphorus 1-20 ppta, boron 1-10 ppta and arsenic 1-10 ppta.

18. The polycrystalline silicon chunk as claimed in claim 17, wherein the dopants are present in the bulk in the following concentrations: phosphorus 1-10 ppta, boron 1-5 ppta and arsenic 1-5 ppta.

* * * * *